United States Patent
D'Angelo et al.

(10) Patent No.: US 8,495,136 B2
(45) Date of Patent: *Jul. 23, 2013

(54) TRANSACTION-INITIATED BATCH PROCESSING

(75) Inventors: Dario D'Angelo, Los Gatos, CA (US); Kin Lau, Mountain View, CA (US); Alan R. Smith, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 119 days.

This patent is subject to a terminal disclaimer.

(21) Appl. No.: 13/051,958

(22) Filed: Mar. 18, 2011

(65) Prior Publication Data

US 2011/0197194 A1 Aug. 11, 2011

Related U.S. Application Data

(63) Continuation of application No. 11/744,645, filed on May 4, 2007, now Pat. No. 7,958,188.

(51) Int. Cl.
*G06F 15/16* (2006.01)
*G06F 9/46* (2006.01)
*G06F 3/00* (2006.01)

(52) U.S. Cl.
USPC .......... 709/203; 709/202; 709/219; 718/101; 718/102; 719/313; 719/317

(58) Field of Classification Search
None
See application file for complete search history.

(56) References Cited

U.S. PATENT DOCUMENTS

| | | | |
|---|---|---|---|
| 4,432,051 A | | 2/1984 | Bogaert et al. |
| 4,918,595 A | * | 4/1990 | Kahn et al. ............. 718/102 |
| 5,327,559 A | | 7/1994 | Priven et al. |
| 5,412,801 A | | 5/1995 | de Remer et al. |
| 5,471,615 A | * | 11/1995 | Amatsu et al. ........... 709/202 |
| 5,473,773 A | * | 12/1995 | Aman et al. ............. 718/104 |
| 5,481,698 A | | 1/1996 | Itoh et al. |
| 5,504,894 A | * | 4/1996 | Ferguson et al. ............. 1/1 |
| 5,530,848 A | * | 6/1996 | Gilbert et al. ............ 719/313 |
| 5,537,542 A | * | 7/1996 | Eilert et al. ............. 709/201 |
| 5,603,029 A | * | 2/1997 | Aman et al. ............. 718/105 |

(Continued)

FOREIGN PATENT DOCUMENTS

| | | |
|---|---|---|
| GB | 2294566 A | 5/1996 |
| JP | 2000357107 A | 12/2000 |
| JP | 2002259590 A | 9/2002 |

OTHER PUBLICATIONS

Abstract and Machine Translation for JP2002259590A, published on Sep. 13, 2002, Total 44 pp.

(Continued)

*Primary Examiner* — B. Tiv
(74) *Attorney, Agent, or Firm* — David W. Victor; Konrad, Raynes, Davda & Victor LLP

(57) ABSTRACT

A system and method is provided for initiating batch processing on a computer system from a terminal. The method generates a message from the terminal, where the message defines a transaction to be performed on a computer system. The transaction schedules and runs a program that extracts data from the message. The message is then transmitted to the computer system. The data is then used to generate batch job control language and a batch job is run on the computer system. The output of the batch job is then routed back to the terminal.

21 Claims, 7 Drawing Sheets

U.S. PATENT DOCUMENTS

| | | | |
|---|---|---|---|
| 5,634,120 A | | 5/1997 | Nagasuka et al. |
| 5,778,387 A | * | 7/1998 | Wilkerson et al. .................... 1/1 |
| 5,892,905 A | | 4/1999 | Brandt et al. |
| 5,960,200 A | | 9/1999 | Eager et al. |
| 5,974,462 A | * | 10/1999 | Aman et al. ................. 709/225 |
| 5,987,251 A | | 11/1999 | Crockett et al. |
| 6,125,384 A | | 9/2000 | Brandt et al. |
| 6,131,190 A | | 10/2000 | Sidwell |
| 6,141,660 A | | 10/2000 | Bach et al. |
| 6,230,183 B1 | | 5/2001 | Yocom et al. |
| 6,233,727 B1 | | 5/2001 | Nagasuka et al. |
| 6,292,885 B1 | | 9/2001 | Nakai et al. |
| 6,427,151 B1 | | 7/2002 | Chan et al. |
| 6,430,708 B1 | | 8/2002 | Evans |
| 6,549,936 B1 | | 4/2003 | Hirabayashi |
| 6,606,640 B2 | | 8/2003 | Smith |
| 6,622,156 B2 | | 9/2003 | Hirabayashi |
| 6,704,015 B1 | | 3/2004 | Bovarnick et al. |
| 6,715,145 B1 | | 3/2004 | Bowman-Amuah |
| 6,817,018 B1 | | 11/2004 | Clarke et al. |
| 6,904,426 B2 | | 6/2005 | Smith |
| 6,934,949 B2 | * | 8/2005 | Smith et al. .................... 718/101 |
| 6,944,618 B2 | | 9/2005 | Smith |
| 7,076,782 B2 | | 7/2006 | Smith |
| 7,093,285 B2 | | 8/2006 | Singhani et al. |
| 7,162,483 B2 | | 1/2007 | Friman |
| 7,174,550 B2 | | 2/2007 | Brice, Jr. et al. |
| 7,191,452 B2 | | 3/2007 | Noden |
| 7,242,498 B2 | | 7/2007 | Fujiwara |
| 7,340,741 B2 | | 3/2008 | Smith et al. |
| 7,404,189 B2 | | 7/2008 | Benedetti |
| 7,490,113 B2 | | 2/2009 | Bourbonnais et al. |
| 7,664,792 B2 | | 2/2010 | Meinsen |
| 7,698,398 B1 | | 4/2010 | Lai |
| 7,707,587 B2 | | 4/2010 | Benedetti |
| 7,734,665 B2 | | 6/2010 | Meinsen |
| 7,831,693 B2 | * | 11/2010 | Lai ................................. 709/220 |
| 7,855,799 B2 | | 12/2010 | Shah |
| 7,945,910 B2 | * | 5/2011 | Wietlisbach et al. ......... 718/101 |
| 7,958,188 B2 | * | 6/2011 | D'Angelo et al. ............ 709/203 |
| 2002/0107902 A1 | * | 8/2002 | Smith ............................ 709/102 |
| 2003/0033446 A1 | * | 2/2003 | Noden ........................... 709/328 |
| 2003/0145049 A1 | | 7/2003 | Hirabayashi |
| 2003/0163511 A1 | * | 8/2003 | Smith et al. .................... 709/101 |
| 2003/0208548 A1 | | 11/2003 | Wydra et al. |
| 2004/0098719 A1 | * | 5/2004 | Smith et al. .................... 718/101 |
| 2004/0172632 A1 | * | 9/2004 | Smith et al. .................... 718/101 |
| 2005/0038830 A1 | | 2/2005 | Lee |
| 2005/0044197 A1 | | 2/2005 | Lai |
| 2005/0066315 A1 | | 3/2005 | Nguyen et al. |
| 2005/0198636 A1 | | 9/2005 | Barsness et al. |
| 2005/0223046 A1 | | 10/2005 | Smith |
| 2006/0031251 A1 | | 2/2006 | Blackman et al. |
| 2006/0122812 A1 | | 6/2006 | Tinseth |
| 2006/0155768 A1 | | 7/2006 | Weil et al. |
| 2006/0294521 A1 | * | 12/2006 | Wietlisbach et al. ......... 718/101 |
| 2007/0061180 A1 | | 3/2007 | Offenberg |
| 2007/0100469 A1 | | 5/2007 | Falsi |
| 2007/0168734 A1 | | 7/2007 | Vasile |
| 2007/0192499 A1 | | 8/2007 | Chiczewski et al. |
| 2007/0216927 A1 | | 9/2007 | Gudimetla |
| 2007/0277174 A1 | * | 11/2007 | Cai et al. ....................... 718/101 |
| 2008/0079983 A1 | * | 4/2008 | Fowler et al. ................. 358/1.15 |
| 2008/0104597 A1 | * | 5/2008 | Smith et al. .................... 718/101 |
| 2008/0126301 A1 | | 5/2008 | Bank et al. |
| 2008/0148261 A1 | | 6/2008 | Ferlitsch |
| 2008/0172579 A1 | | 7/2008 | Hahm et al. |
| 2008/0177798 A1 | | 7/2008 | Meinsen |
| 2008/0275944 A1 | * | 11/2008 | D'Angelo et al. ............ 709/203 |
| 2009/0063577 A1 | | 3/2009 | Smith |
| 2009/0204645 A1 | | 8/2009 | Machida et al. |
| 2009/0204810 A1 | | 8/2009 | Benantar et al. |
| 2010/0257505 A1 | | 10/2010 | Hinchey et al. |
| 2011/0197194 A1 | * | 8/2011 | D'Angelo et al. ............ 718/101 |

OTHER PUBLICATIONS

Abstract and Machine Translation for JP2000357107A, published on Dec. 26, 2000, Total 33 pp.

Amendment 1, Oct. 7, 2009, for U.S. Appl. No. 11/744,645, Total 13 pp.

Amendment 2, Jul. 25, 2010, for U.S. Appl. No. 11/744,645, Total 10 pp.

Amendment 3, Dec. 16, 2010, for U.S. Appl. No. 11/744,645, Total 14 pp.

Final Office Action 1, Oct. 15, 2010, for U.S. Appl. No. 11/744,645, Total 26 pp.

IBM, "MVS JCL User's Guide", Sep. 2004, Fifth Edition, Total 324 pp.

IBM, "MVS JCL User's Guide" Mar. 1999, Sixth Edition, Total 342 pp.

IBM, "MVS JCL Reference" Sep. 2000, Tenth Edition, Total 700 pp.

Notice of Allowance 1, Jan. 26, 2011, for U.S. Appl. No. 11/744,645, Total 21 pp.

Office Action 1, Sep. 9, 2009, for U.S. Appl. No. 11/744,645, Total 78 pp.

Office Action 2, Apr. 12, 2010, for U.S. Appl. No. 11/744,645, Total 24 pp.

* cited by examiner

TRANSACTION-INITIATED BATCH PROCESSING

This application is a continuation of U.S. patent application Ser. No. 11/744,645, filed on May 4, 2007, which patent application is incorporated herein by reference in its entirety.

FIELD OF INVENTION

The present invention generally relates to systems and methods for processing batch jobs in a computer system, and in particular to systems and methods for initiating batch processing in a computer system from a remote terminal.

BACKGROUND

Databases, such as IBM's IMS (Information Management System), are well known in the art. (IMS is a trademark of International Business Machines Corporation in the United States, other countries, or both.) IMS is a hierarchical database management system with widespread usage in many large enterprises where high transaction volume, reliability, availability and scalability are of the utmost importance. IMS provides software and interfaces for running the businesses of many of the world's largest corporations.

A large database management system (DBMS), such as IMS, is highly scalable and in some enterprise environments may accommodate thousands, or even tens of thousands, of users connected to the system at any given point in time. To manage the transactions initiated by these users, IMS includes a centralized transaction management system (TMS). With the advent of the Internet and the World Wide Web (Web), it is desirable to make the data contained in a centralized TMS more accessible through remote application programs (clients) that communicate with software running at the host system (server) to access the desired information. Usually, the software running on the host system will execute, or have executed, a transaction that has results data associated therewith upon completion of the transaction.

IMS is usually run on a mainframe operating system such as IBM's z/OS. IMS will typically run IMS-related z/OS batch jobs. However, there is a need to run a wide variety of batch jobs which may include, for example, batch IMS-related tools and utilities, other non-IMS DBMS-related tools and utilities, non-DBMS-related tools and utilities, vendor product tools and utilities, system status monitoring and reporting and application programs.

The initiation of z/OS batch jobs is often via production scheduling or automated processes, but z/OS batch jobs can also be initiated by users. Such jobs are typically submitted from a Time Sharing Option (TSO) session userid on a z/OS machine, or transmitted to a z/OS machine from a Virtual Machine (VM) userid. However, with the increased usage of web-based processing, many users may not access, or even possess z/OS or VM machine userids. Even without mainframe access, such users may wish to invoke batch processes, and have the results of such processes returned for access by a web-based userid.

IMS product features, such as IMS Connect, are capable of routing IMS transactions from a web-based userid to IMS running on a z/OS machine. Typically, such a transaction is queued as an input message to the IMS message queue, and is read from the queue by an application program known as an IMS Message Processing Program. This program runs in an address space known as a Message Processing Region (MPR). The MPP performs the processing it was coded to perform, and may ultimately return a specific display, or IMS output message, to the invoking web-based userid through IMS TMS and IMS Connect, or to an invoking IMS terminal. However, web-based users are not able to invoke non-IMS functions, such as initiate non-IMS batch jobs without a z/OS machine userid.

Accordingly, there is a need for increased access and flexibility for web-based users of database systems, such as IMS. There is also a need for web-based users without mainframe userid access to initiate batch jobs on database systems, such as IMS.

SUMMARY OF THE INVENTION

To overcome the limitations in the prior art briefly described above, the present invention provides a method, computer program product, and system for initiating batch processing through a web-based transaction. In one embodiment of the present invention a method for initiating batch processing on a computer system from a terminal comprises: generating a message from the terminal, the message identifying a transaction to be initiated on a computer system, the transaction also scheduling and running a program that extracts data from the message; transmitting the message to the computer system; using the data to generate batch job control language; running the batch job on the computer system; and routing the output of the batch job to the terminal.

In another embodiment of the present invention, a computer implemented method for initiating batch processing in a mainframe computer system comprises: receiving a request to perform a batch process from a client terminal, wherein the request includes data; extracting the data from the request; mapping the data into a job control language (JCL) skeleton; generating batch job control language for the JCL skeleton; running the batch job on the computer system to generate an output; and returning the output to the client terminal.

A further embodiment of the present invention, is an article of manufacture for use in a computer system having a transaction management system tangibly embodying computer instructions executable by the computer system to perform process steps for generating response to a message containing a batch job request from a web-based terminal, wherein the process steps comprise: reading the message; parsing the message to extract data; mapping the data onto a job control language (JCL) skeleton; formatting an output of the mapping process so that it can be submitted to web-based users; generating a set of batch JCL streams; and submitting the JCL streams to the transaction management system.

In an additional embodiment of the present invention, a computer system comprises: a database; a server computer coupled to the database; a client computer coupled to the server computer through the internet; a database management system coupled to the server computer and to the database having a message processing region, the database management system including a message processing region containing an application program and a control region containing a message queue; the client computer including a program for providing a message from the client computer to the message queue, the message defining a batch job transaction to be performed on the server computer; wherein the transaction schedules and runs a program that extracts data from the message, the data being used to generate batch job control language, the batch job control language being used to run the batch job on the server computer; and the server generating an output from the batch job and transmitting the output to the client computer through the internet.

Various advantages and features of novelty, which characterize the present invention, are pointed out with particularity in the claims annexed hereto and form a part hereof. However, for a better understanding of the invention and its advantages, reference should be make to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

Figure 1:
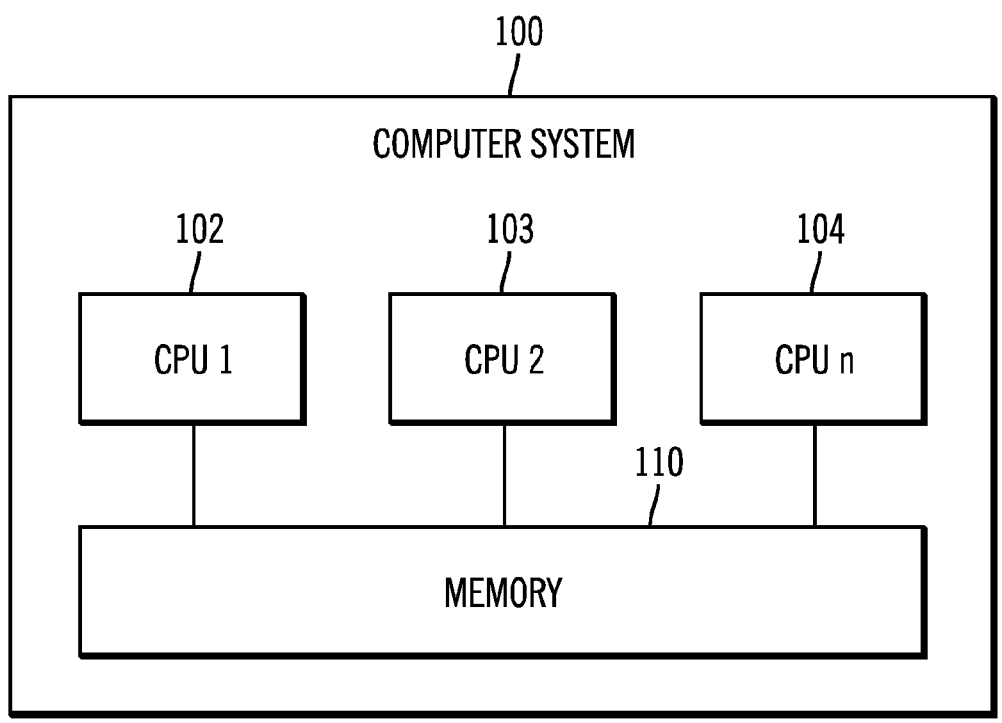
FIG. 1 is a block diagram of a typical computer system wherein the present invention may be practiced.

The present invention overcomes the problems associated with the prior art by teaching a system, computer program product, and method for performing transaction-initiated batch processing from a web-based terminal. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram of a computer system 100, such as the z/OS mainframe computer system, in which teachings of the present invention may be embodied. The computer system 100 comprises one or more central processing units (CPUs) 102, 103, and 104. The CPUs 102-104 suitably operate together in concert with memory 110 in order to execute a variety of tasks. In accordance with techniques known in the art, numerous other components may be utilized with computer system 100, such a input/output devices comprising keyboards, displays, direct access storage devices (DASDs), printers, tapes, etc. (not shown).

Although the present invention is described in a particular hardware embodiment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

The present invention is a system and method for initiating batch processing on a computer system from a terminal. The system processes a message received from the terminal, where the message defines a transaction to be performed on the computer system. The transaction schedules and runs a program that extracts data from the message. The message is then transmitted to the computer system. The data is then used to generate batch job control language and a batch job is run on the computer system. The output of the batch job is then routed back to the terminal.

Figure 2:
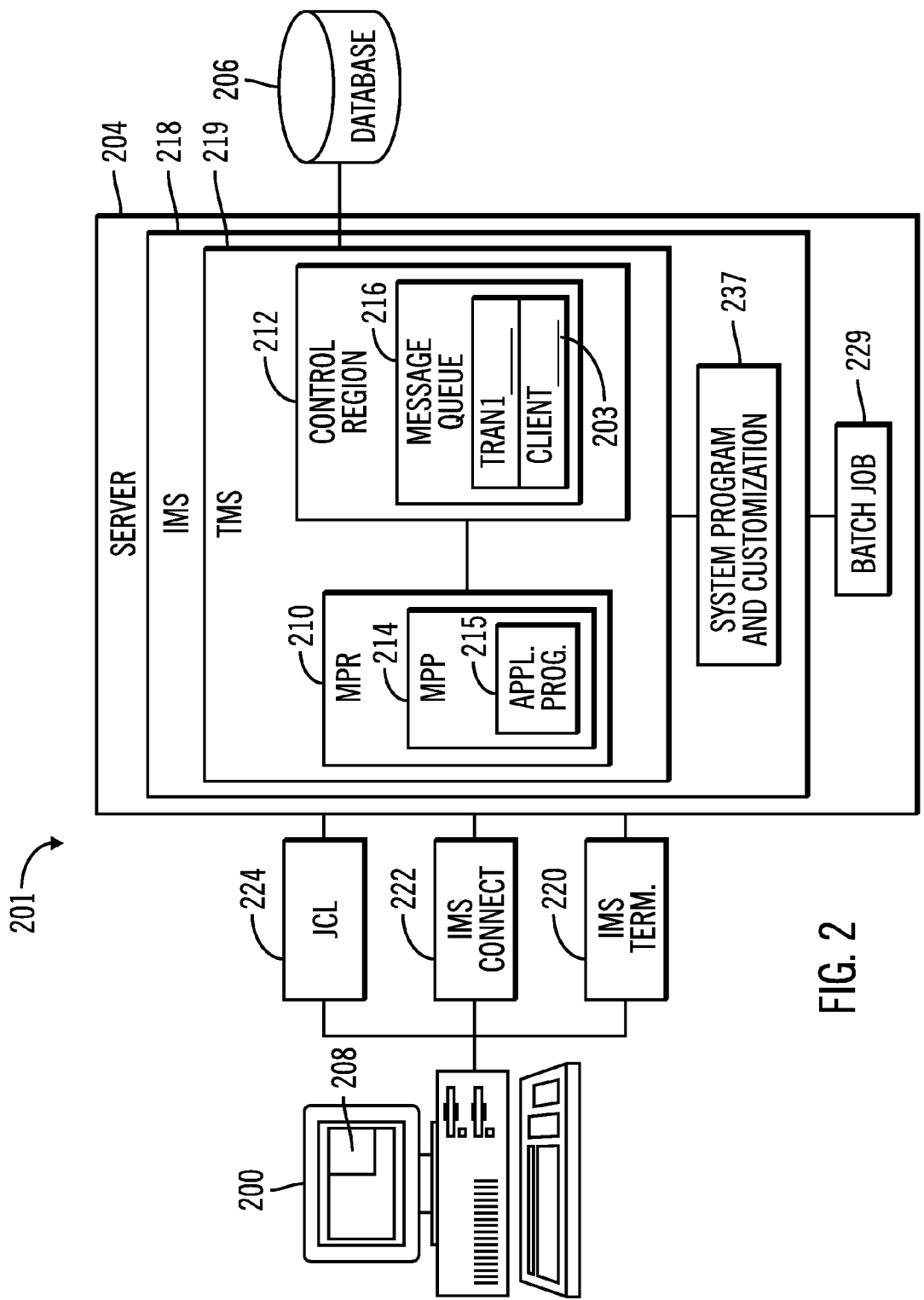
FIG. 2 is a block diagram of an exemplary hardware environment used to implement an embodiment of the present invention.

Referring now to FIG. 2, a block diagram is shown illustrating a system and method for transaction-initiated batch processing according to one embodiment of the invention. Transaction-initiated processing system 201 includes one or more client user terminals 200 that execute one or more client programs 208 operating under the control of an operating system (not shown). These computer programs 208 transmit requests to a server computer 204, such as a z/OS mainframe computer system for performing various functions and to receive data from server computer 204 in response to the requests.

The server computer 204 manages one or more databases 206 stored on one or more data storage devices, such as a fixed or hard disk drive, a floppy disk drive, a CD-ROM drive, a tape drive, or other device. In a preferred embodiment, the database 206 is managed by the IMS database management system (DBMS) 218 offered by IBM Corporation. Those skilled in the art will recognize, however, that the present invention may be applied to a variety of other databases and associated database management system.

The present invention is generally implemented using a number of components executed by client computers 200 and server computers 204. These components include client programs 208, server IMS 218, database 206, IMS Transaction Management System 219, message processing region 210, message processing program 214, application program 215, control region 212, and message queue 216, wherein each of these components comprise instructions and/or data. Other resources that communicate with, or are managed by, server IMS 218 include IMS terminals 220, IMS Connect component 222 and job control language (JCL) component 224.

Generally these components, instructions and data 206-224 are all tangibly embodied in or retrievable from a computer-readable device, medium, or carrier, e.g. a data storage device, a data communications device, etc. Moreover, these instructions an/or data, when read, executed, and/or interpreted by the client computer 200 and/or the server computer 204, cause the client computer 200 and/or the server computer 204 to perform the steps necessary to implement and/or use the present invention.

Client program 208 initiates transactions and receives results from server computer 204. Those of ordinary skill in the art will recognize that this process results in messages 203 being written to message queue 216 in control region 212 to record incoming transactions as well as outgoing results to be received by online user terminal 200.

IMS Connect 222 is an existing IMS product feature that is capable of routing IMS transactions from a web-based userid to IMS running on a z/OS machine. Typically, such a transaction is queued as an input message 203 to the IMS message queue 216, and is read from the IMS message processing program (MPP) 214 running in the address space known as the message processing region (MPR) 210. The MPP 214 performs the processing it is coded to perform, and may ultimately return a specific display, or IMS output message, to the invoking web-based userid through IMS TMS 219 and IMS Connect 222, or to an invoking IMS terminal 220. However, IMS Connect 222 has certain limitations. It cannot itself generate and submit JCL to run one or more asynchronous batch jobs.

In contrast, the present invention allows a transaction, which is routed to IMS 218 from an IMS Terminal 220 or via IMS Connect 222, to itself generate and submit JCL to run one or more asynchronous batch jobs. The application program 215 contains a JCL generation program, as described below and shown in FIG. 3, running in the message processing region 210. The application program 215 does not necessarily need to perform any IMS-related application processing nor does it need to return an IMS output message, although it is capable of performing such functions. Likewise, the generated batch jobs do not necessarily need to perform any IMS-related function at all, but can perform any function which the have been designed to perform. Such batch jobs can include, but are not limited to: batch IMS-related tools and utilities, other non-IMS DBMS-related tools and utilities, non-DBMS-related tools and utilities, vendor product tools and utilities, system status monitoring and reporting, and application programs.

In one embodiment of the invention, the output from the batch jobs can be routed back to the originating, or any other specified web-based userid, without using the IMS TMS 219 or IMS Connect 222 infrastructure. Even if the transaction originated from an IMS terminal 220, the report can still be routed to a web-based userid. As a result, a user without a z/OS userid can submit IMS or non-IMS batch jobs and be returned the output from such jobs.

In another embodiment of the invention, the transaction-initiated processing system 201 is implemented on a database management system besides IMS 218. Those skilled in the art will appreciate that in such a non-IMS embodiment, the transaction-initiated processing system 201 will include components and functions equivalent to those shown in FIG. 2 and described herein.

JCL unit 224 performs a process, called GENJCL, which may be performed, for example, by a DSPURX00 program. GENJCL currently exists as an IMS facility used to generate and submit JCL streams. However, there are at least four important differences between the present invention and the JCL unit 224 GENJCL process. First, GENJCL is invoked via an IMS command, rather than IMS transaction as with the present invention, and there currently is no interface for issuing IMS commands from web-based userids with GENJCL as there is with the present invention.

Second, GENJCL is invoked at the IMS sub-system level such that there is no application associated with the JCL generation process. There is no mechanism such that an application can map data passed from an input message, or data acquired through application processing into the generated JCL. In contrast, with the present invention, a transaction is invoked at the IMS MPR 210 level, which is designed to process application programs.

Third, GENJCL is typically used to perform IMS-related functions, such as database image copy or recovery. The present invention can be used for most z/OS batch jobs.

Fourth, GENJCL does not have the infrastructure to wrap the proper statements around outputs such that these can be routed back to web-based userids. In the present invention, outputs are configured to be routed back to web-based userids.

In accordance with one embodiment of the invention, z/OS batch JCL streams are submitted from web-based clients 200 having only web-based userids. In another embodiment of the invention, z/OS batch JCL streams having only web-based userids are submitted from IMS terminals 220. In general, the system 201 returns output through the following process steps a-h, which are performed primarily by the application program 215.

a) The web-based client 200 invokes a web-based display to create a character string, message 203, to be passed to IMS 218 as a transaction. Alternatively, an IMS terminal 220 issues a transaction directly.

b) If a web-based client 200 issued the transaction, IMS Connect 222 is used to pass the transaction to the IMS TMS 219.

c) The transaction schedules and runs one of the components within the application program 215, which extracts data from the message to determine which JCL skeletons are to be included, and to map data from the message into the JCL skeletons. As described in more detail below, JCL skeletons are skeletal components of JCL which can be edited and combined to produce batch JCL streams.

d) The TMS 219 then may optionally perform IMS-related processing and access databases 206. The results of this processing may also be mapped into the generated JCL skeletons.

e) Batch job JCL is generated in the application program 215 from the skeletons and mapped data, including JCL steps which associate the web-based userid to where the output is to be routed with the output that is to be returned.

f) The batch jobs are submitted by being written to an internal reader output class within the application program 215.

g) The batch jobs run, including the steps which wrap the appropriate statements around output files, such that they can be routed to web-based userids.

h) Web-based users can access the output which has been returned.

Steps a and b utilize the IMS Connect 222 infrastructure to utilize the IMS TMS 219. Steps c through h are performed by the application program 215.

Figure 3:
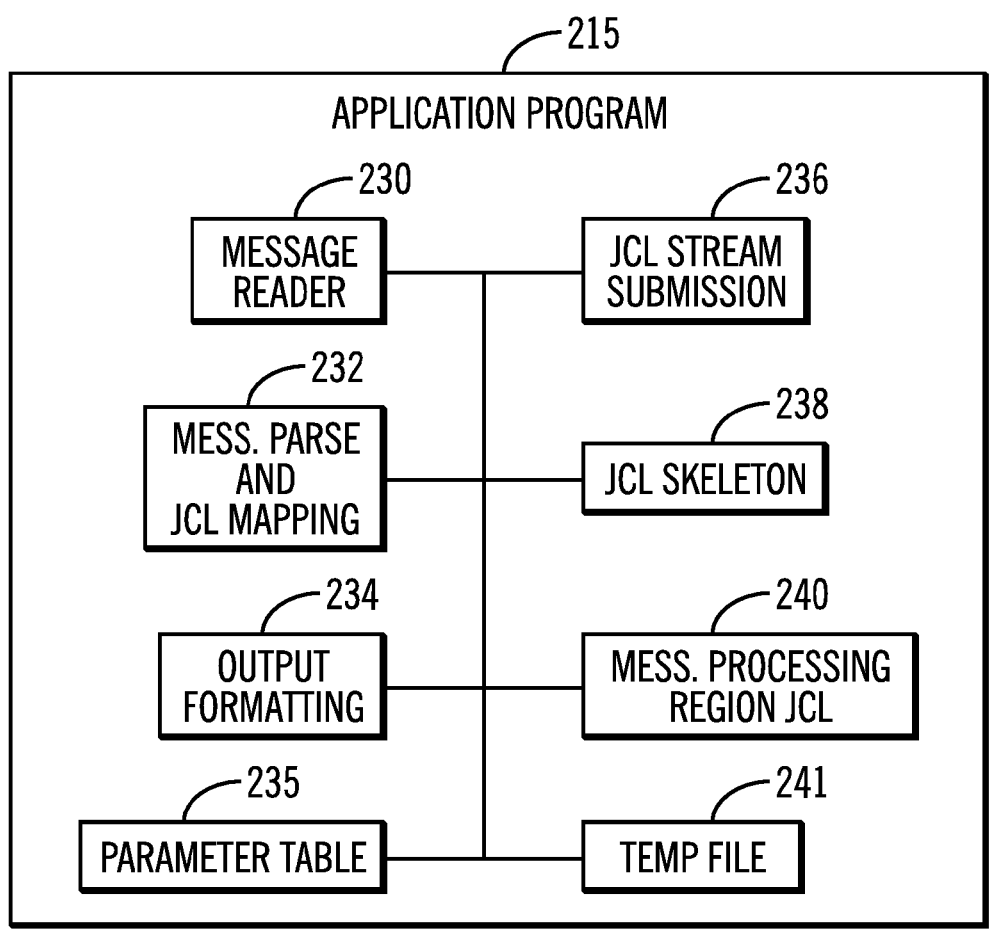
FIG. 3 is a block diagram of the batch processing components shown in FIG. 2.

Referring now to FIG. 3, a block diagram of the application program 215 is shown, which includes at least six components: message reader 230, message parse and JCL mapping 232, output formatting 234, parameter table 235, JCL stream submission 236, JCL skeleton 238, message processing region JCL 240 and temporary file 241. The message reader 230 reads the input message 203 from the IMS message queue 216. The message reader 230 associates a transaction name to the name of an application program 215 program, both of which are defined in an IMS Sysgen module (not shown) within a system program and customization unit 237 (shown in FIG. 2) or equivalent. The IMS Sysgen module in the system program and customization unit 237 is also where the transaction is defined to a class supported by the message region in which the component program is to process. IMS Sysgen (also referred to as 'GEN') is where the creation, compilation and link-editing of macros which customize the IMS system for a local installation occurs. Specific local components, buffer pool sizes, inter-component communication and a host of other local installation parameters are also defined and described as part of the IMS Sysgen.

The message parse and JCL mapping component 232 parses the input message 203, generates the JCL for invoking the batch processing, and can map variables into such JCL. The message parse and JCL mapping component 232 does the following:

1) Dynamically accepts character strings from the input message to be used to identify parameters or components to be mapped into skeletons;
2) Recognizes the supplied data-mapping character strings in the skeletons and other components which are to be dynamically customized;
3) Maps the components into the skeletons; and
4) Determines what parts of the skeleton are to be retained and which are to be removed, based upon character string indicators.

The output formatting component 234 formats the output such that it can be routed to specified web-based userids. The JCL stream submission component 236 submits the generated JCL streams to a Simple Mail Transfer Protocol (SMTP) facility. The JCL skeleton component 238 is a data set containing customizable JCL skeletal components which can be edited and combined to produce batch JCL streams. The message processing region JCL component 240 has the following characteristics:

1) Access the executable modules and facilities 230-238 above;
2) Contains a DD (data definition) statement to access the JCL skeleton 238 JCL data set; and
3) Contains a DD statement to access the z/OS internal reader, which is used to submit the generated JCL stream.

The functions of the parameter table 235 and the temporary file are described in detail below.

Referring now to FIGS. 4-7 flow charts illustrating one embodiment of the present invention are shown. In particular, as illustrated in the exemplary embodiment shown in FIGS. 4-7, the present invention is used by a web-based user who has issued an IMS transaction, resulting in a batch job being submitted to query and summarize the contents of a log data set. The resultant report is returned to the user in an e-mail. The present invention generates utilities to summarize activity on the IMS logs (not shown) and to return such reports to the originating web-based user.

A. Read Transaction

Figure 4:
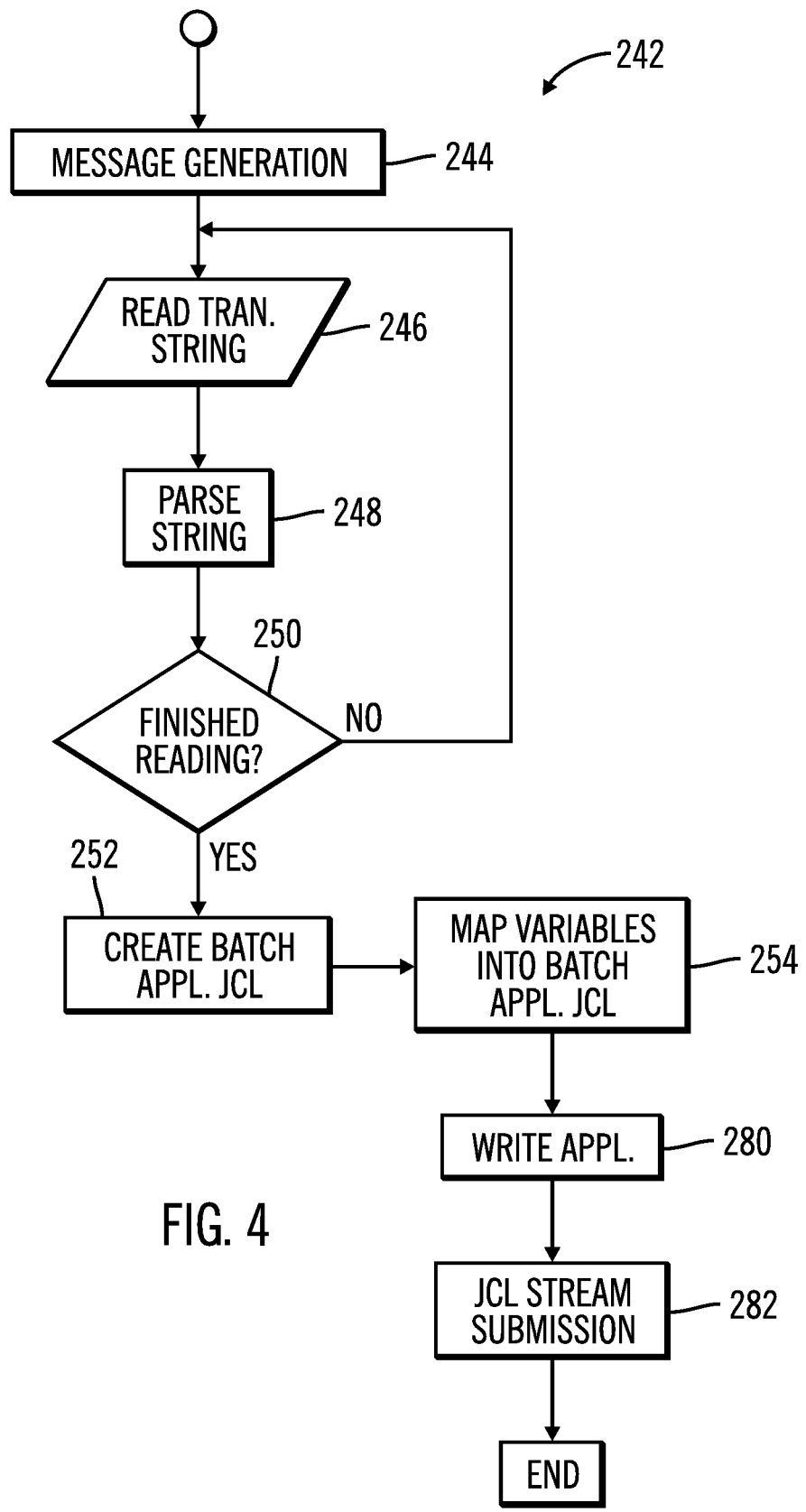
FIG. 4 is a flowchart illustrating the steps performed by the hardware environment shown in FIG. 2 for performing transaction-initiated batch processing in accordance with an embodiment of the invention.

In a transaction-initiated batch process 242 shown in FIG. 4, a web-based client 200 (shown in FIG. 2) generates a message identifying an IMS transaction and containing transaction data, shown in step 244. A read transaction string step 246 reads the input message. This may be accomplished by the message reader component 230, which may be a typical IMS TMS 219 application program. Note that message reader component 230 should be associated with a transaction defined to IMS. Message reader component 230 retrieves the input message from the IMS message queue 216 with a Get Unique (GU) call, and then passes the message and control to the message parse and JCL mapping component 232, which performs the parse string step 248.

B. Message Parse and JCL Mapping

Steps 248, 250, 252 and 254 are performed by the message parse and JCL mapping component 232, which takes the transaction input message and members from the JCL skeleton as input. As output, it generates JCL which has incorporated all of the elements described below. In particular, in step 248, the input message is read and character strings to be used to identify parameters, or components to be mapped into JCL skeletons, are dynamically accepted. Also, the supplied data-mapping character strings in the skeletons which are to be dynamically customized are recognized.

Message Parse and JCL Mapping component 232 may be a routine in a TMS 219 application program, or may be an additional program to which control is passed. The following is an example of a transaction input message which would be entered by a web-based user, or on an IMS terminal:

---

TRAN1
TASK=REPORT,TASK=EMAIL,MAILFROM=userid@us.ibm.com,
MAILTO=userid2@us.ibm.com,SENDER=useri

---

In this example:
a) The name of the transaction being scheduled is: TRAN1.
b) TASK=REPORT indicates that PDS (Partitioned Data Set) member
   REPORT is a skeleton to be included in the generated JCL.
c) TASK=EMAIL indicates that PDS member EMAIL is a skeleton to be included in the generated JCL.
   (The order in which the TASK=parameters are specified represents the order in which the PDS members will be included in the generated JCL.)
d) MAILFROM=, MAILTO=, and SENDER=all represent substitution variables whose data values will be mapped into the generated JCL.

An alternate specification of the same input message is:

TRAN1 PARMS=USERPARM,TASK=REPORT, TASK=EMAIL where USERPARM is a PDS member which contains the following substitution variables:

```
MAILFROM=userid@STLMVS1
MAILTO=userid@us.ibm.com
SENDER=userid
SUBJECT=Batch_Processing
```

Optionally, the input message reading component could contain routines or pass control to routines which could perform IMS-related processing. Such processing could include accessing IMS databases or interfacing with other DBMS. If such processing is required, the Program Specific Block (PSB) associated with the transaction must support such database or DBMS processing. Data retrieved or generated during such processing could be mapped into substitution variables in the JCL skeletons.

Figure 5:
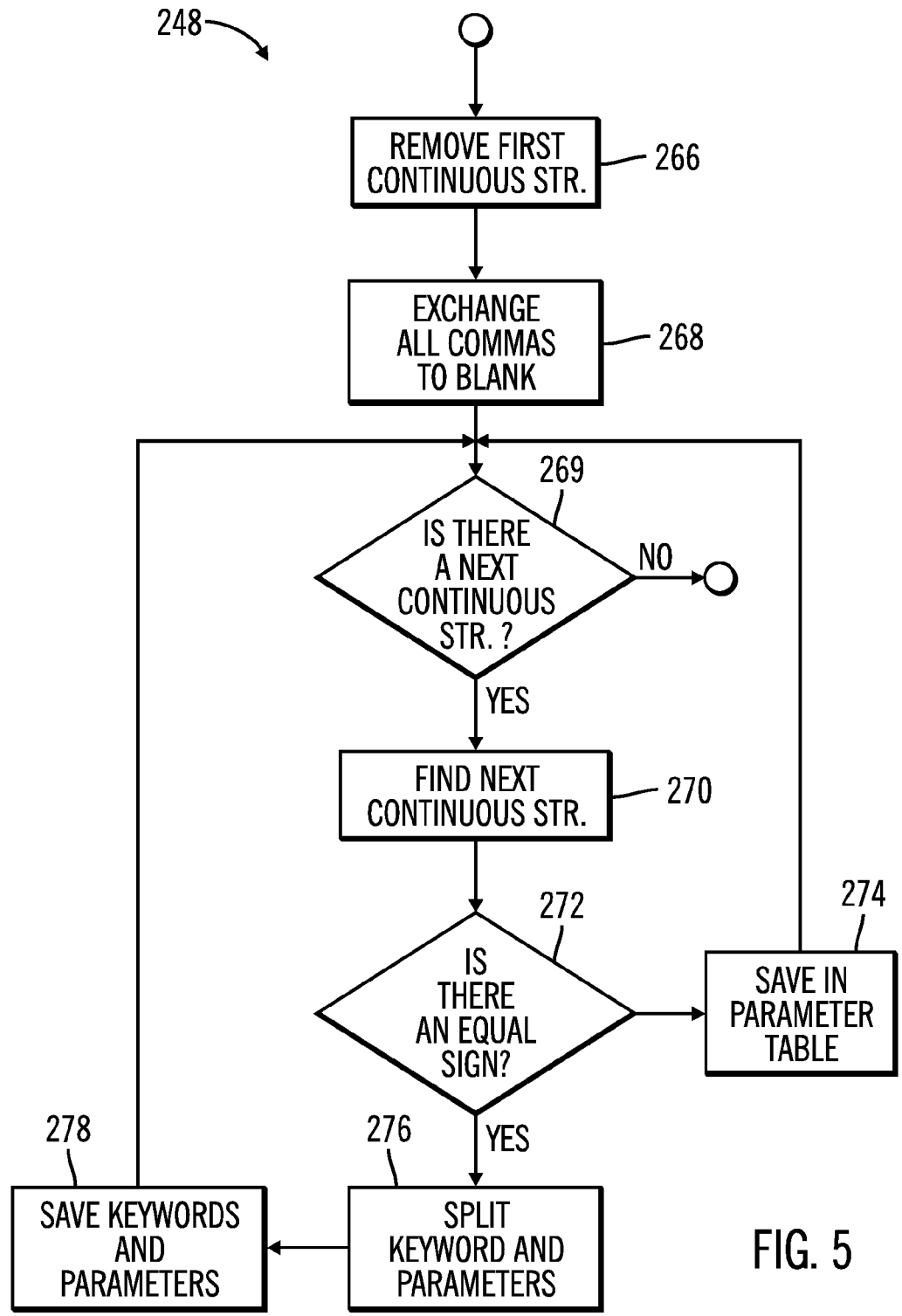
FIG. 5 is a flowchart illustrating the steps performed in the parsing step shown in FIG. 4.

Further details of step 248 are shown in the flow chart in FIG. 5. First, step 266 removes the first continuous string in the input message 203. Step 268 exchanges all commas for blanks. Step 269 determines if there is a next continuous string. If there is not, step 248 is complete and the process proceeds to step 250 in FIG. 4. If there is a next continuous string, step 270 finds the next continuous string and step 272 determines if there is an equal sign. If there is not equal sign, step 274 will save the character string as a parameter in parameter table 235 from the input message 203. For example, if the input message contained a continuous string such as: TESTVAR, there is no equal sign in such a parameter, and step 274 saves this string in the parameter table 235. However, if the continuous string was coded: TESTVAR=ABCD, there is an equal sign such that step 278 saves TESTVAR as a keyword and ABCD as a parameter. Both entities are saved in parameter table 235. The process will then return to step 269.

If step 272 determined that there was an equal sign, step 276 is performed, which splits the keywords and parameters, such that in step 278 these can be saved as separate parameters in parameter table 235. The process then returns to step 269.

Figure 6:
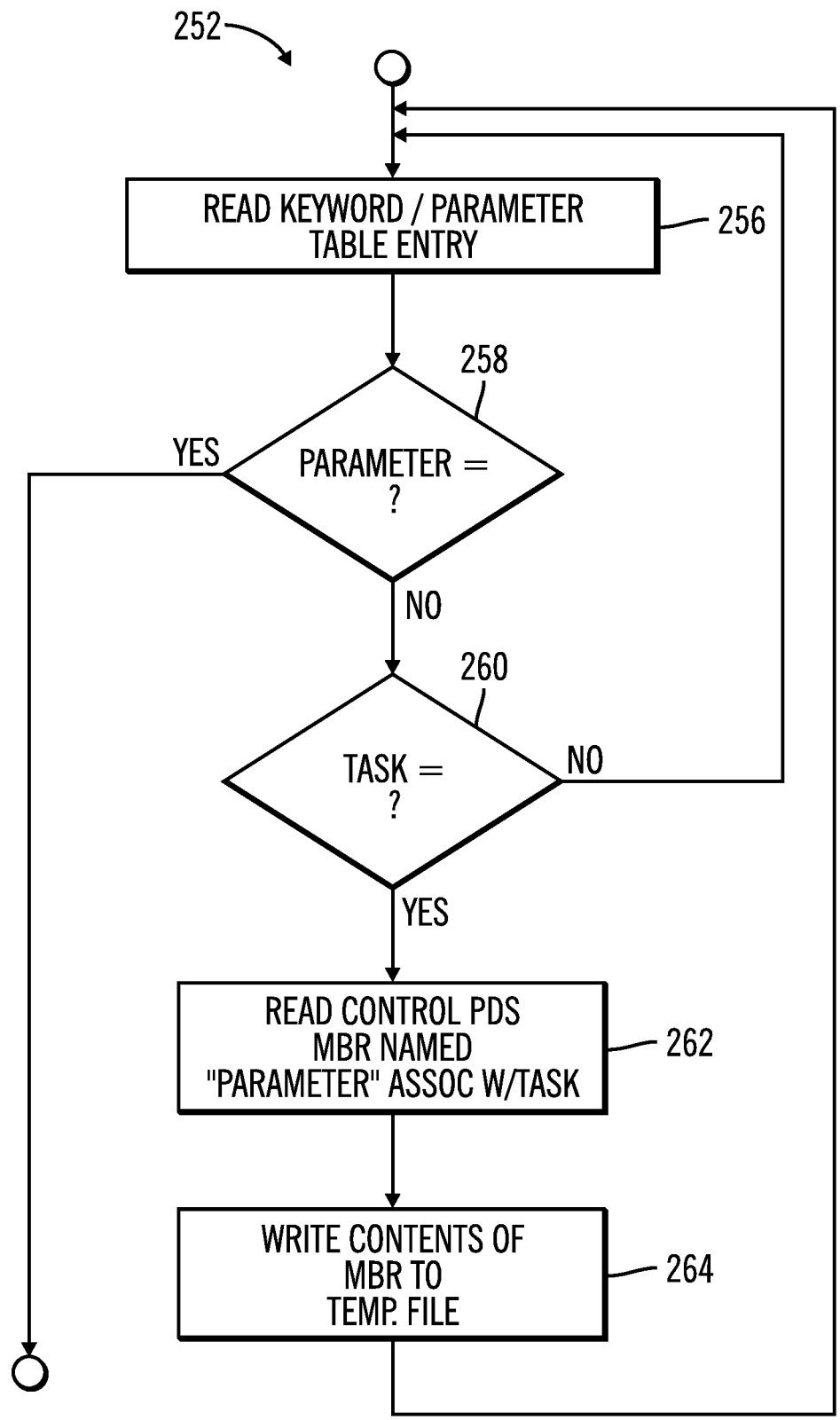
FIG. 6 is a flowchart illustrating the steps performed in the create batch application JCL step shown in FIG. 4.

Referring again to FIG. 4, step 250 determines if the input message is read completely, and if not, the process returns to step 246 to continue reading the input message. Once the input message is read, the process continues to step 252 which creates batch application JCL. Further details of step 252 are shown in FIG. 6. The first step in creating JCL is step 256, which is to read the keyword/parameter table entry from parameter table 235, as explained in more detail below. Next, in step 258, the process determines if the last parameter has been read. If so, step 252 is completed and the process proceeds to step 254 in FIG. 4. If not, the process proceeds to step 260, which determines if other JCL members are to be included in the generated JCL. If there are no other JCL members, step 256 is repeated. If there are other JCL members, the process moves to step 262, which reads the control PDS member named "parameter" associated with the task. Next, step 264 writes the contents of the member (skeletal JCL records) to a temporary file. Next, the process returns to step 256 and the process 252 continues until step 258 determines that the last parameter is read and the process returns to step 254 in FIG. 4.

Figure 7:
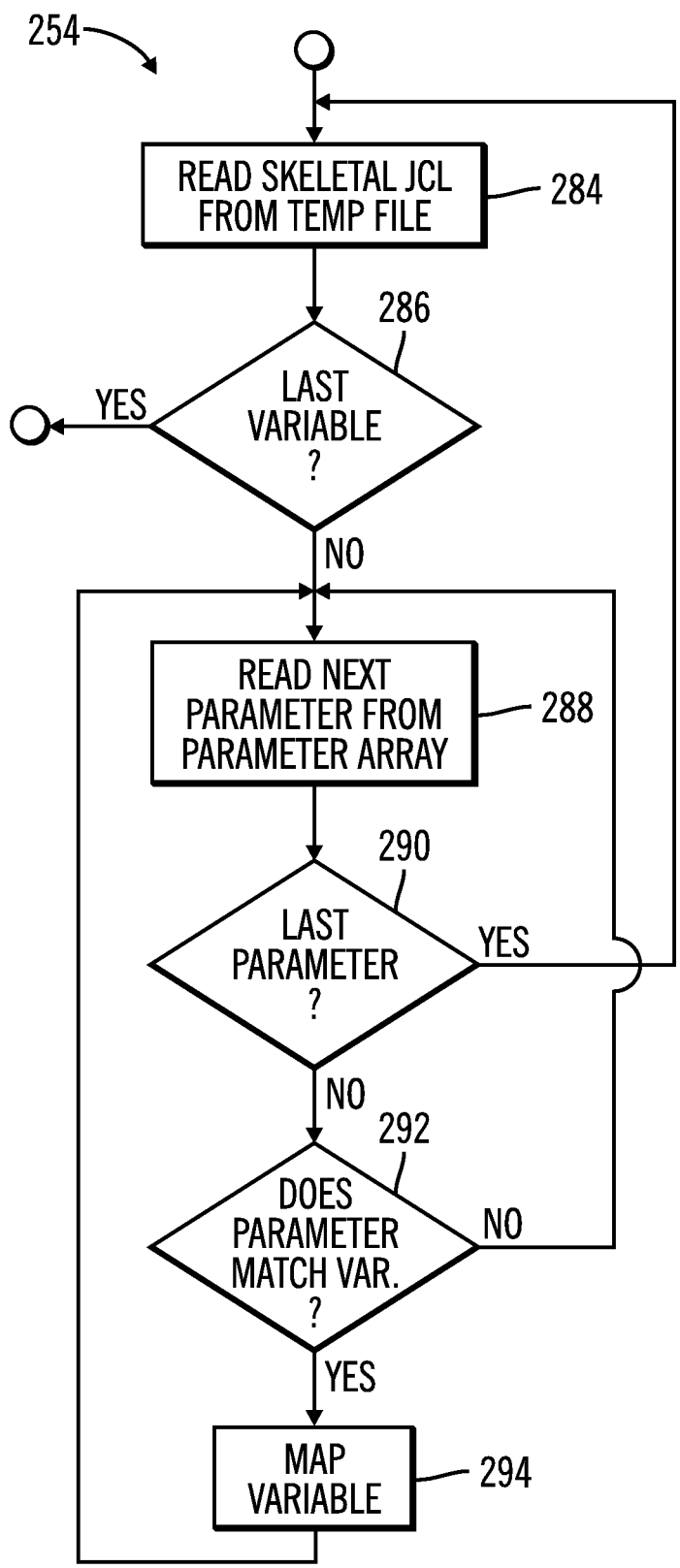
FIG. 7 is a flowchart illustrating the steps performed in the map variables into batch application JCL step shown in FIG. 4.

Referring again to FIG. 4, after step 252, step 254 maps the variables in the input message 203 into the batch application JCL. As part of this step the process will determine what parts of the skeleton are to be retained and which are to be removed, based upon character string indicators. FIG. 7 shows a flow chart of step 254 in more detail. In step 284, skeletal JCL records from temporary file 241 are read. In step 286, the process determines if the last variable is read. If so, the process moves to step 280 in FIG. 4. If not, the process reads the next parameter from the parameter table 235 in step 288.

In step 290, the process determines if the last parameter has been read. If so, the process returns to step 284 to read the next variable from the temporary file 241. If not, step 292 determines if the parameter from the parameter array matches a variable on the line indicating that a value should be mapped into the line. If not, the process returns to step 288 to read the next parameter. If the answer is yes in step 292, then the process moves to step 294 and the variable is mapped onto the line. The process then returns to repeat step 288. Once all the variables have been mapped into batch application JCL, step 254 is complete and the process proceeds with step 280 in FIG. 4.

1. Sample Input Message Text Keyword Syntaxes

As a further explanation of steps 248-254, exemplary input message text keyword syntaxes in accordance with one embodiment of the invention will be described.

a.) Reserved Keywords

Reserved Keywords represent variables which are explicitly predefined in the parser. They represent character strings in the transaction input message which either indicate an action to be taken, or are associated with values supplied by the user. The present embodiment includes reserved keywords such as:

JOBCARD=which is used to specify the JCL skeleton member to be used as the JOB statement. If it is omitted, the default skeleton name is a value of JOBCARD.

TASK=which is used to specify other JCL skeleton members to be included in the generated JCL. There are no default values for this keyword. It can be specified multiple times, in which case, the JCL skeletons are appended in the order that TASK=has been specified.

PARMS=which is used to specify a PDS member which contains substitution variables that are to be mapped into JCL skeletons. There are no default values for this keyword. It can be specified only once.

JOBGENER which indicates that a logical grouping of skeletons into a JOB JCL stream has been completed. If this keyword is omitted, it is assumed that all of the skeletons indicated by TASK=keywords are to be grouped as a single JCL stream. It can be specified multiple times, which allows for a single transaction input message to result in multiple JCL streams. Each time JOBGENER is specified, the preceding JCL skeletons indicated by TASK=keywords are grouped as a JCL stream, preceded by the JOBCARD JCL skeleton member.

b) Substitution Variables ('Keyword')

Substitution variables are variables that users can dynamically define, which will be mapped into the JCL skeletons at the location of corresponding substitution labels. There is no convention for what the 'keyword' string must be, as the parser allows dynamically defined keywords. There is no limit to the number of substitution variables, as long as they are unique. The associated substitution parameter value will be mapped into the JCL skeletons where a corresponding value of '#keyword' is encountered. A substitution variable which does not match a substitution label is ignored.

2. Sample Skeleton Text Keyword Syntaxes

The following sample syntaxes are exemplary of one possible embodiment of the invention.

a) Substitution Variable Labels ('#keyword')

Substitution Variable Labels identify the labels at which substitution variables which will be mapped into the JCL skeleton. There is no convention for what the '#keyword' string must be, as the parser allows dynamically defined substitution keywords. The associated substitution variable value will be mapped into the JCL skeletons wherever a corresponding value of '#keyword' is encountered. The '#keyword' label may occur multiple times on a statement, and/or on multiple statements. The substitution variable labels are user definable; they must only have a matching 'keyword' string as a substitution variable. Substitution variable labels can also be used to identify variables where data was not included in the transaction input message, but was extracted during IMS-related processing initiated by the transaction so they can be mapped into the skeletal JCL.

Some special substitution variable labels are predefined to the parser:

DATE which indicates that the system date is to be mapped into the skeletal JCL.

TIME which indicates that the system time is to be mapped into the skeletal JCL.

b) Line Exclusion Delimiters ('% keyword')

The expression '% keyword' identifies line inclusion delimiters which indicate that lines between the delimiters are to be excluded, where 'keyword' is one of the substitution variables. The line inclusion delimiters are specified in column 1, and the lines containing the delimiter will not be included in the generated JCL. Lines containing line exclusion delimiters occur in pairs, with a "begin delimiter" line and an "end delimiter line". If a value has not been supplied for the parsing substitution variable, the lines occurring between the lines containing the line inclusion delimiters will be excluded from the generated JCL; otherwise, these lines will be included.

C. Output Router Formatting Component

Referring again to FIG. 4, after step 254 is complete, the process moves to step 280, labeled "write application". This step is performed by the output formatting component 234 shown in FIG. 3, which formats the output for routing to a web-based user, by performing three steps:

1) A special customizable skeleton is appended to precede the output from batch processing (EMAILPRE);

2) A special customizable skeleton is appended after the output from batch processing (EMAILSUF); and 3) An IEBGENER step appends the pieces together and routes them to a recipient using Simple Mail Transfer Protocol (SMTP) to send such mail.

SMTP is an MVS (Multiple Virtual Storage) function provided with TCP/IP Version 3 Release 1 for MVS, to prepare and send electronic mail. Recipients of the mail can be users on a local host system, users on Network Job Entry (NJE), or users on TCP hosts.

The following is an example of the text which precedes the batch job output in one embodiment of the invention. This model is stored as member EMAILPRE in the skeleton data set.

```
HELO HOST
MAIL FROM:<#MAILFROM>
RCPT TO:<#MAILTO>
NOOP
```

-continued

```
DATA
MIME-Version: 1.0
FROM: #SENDER <#MAILFROM>
Subject: #SUBJECT
Content-Transfer-Encoding: binary
Content-Type: multipart/alternative;
    boundary="--=_Boundary_017254381437.4529572916"
----=_Boundary_017254381437.4529572916
Content-Type: text/plain
```

In this example, #MAILFROM, #MAILTO, #SENDER and #SUBJECT represent substitution keyword variables, into which values extracted from the transaction input message will be mapped.

The following is an example of the text which follows the batch job output in accordance with one embodiment of the invention. This model is stored as member EMAILSUF in the skeleton data set.

```
----=_Boundary_017254381437.4529572916--
----=_Boundary_017254381437.4529572916--
.
QUIT
```

The following is an example of the IEBGENER JCL which appends the pieces. In this example, the following is member EMAIL in the PDS, as specified on one of the TASK=keywords on the example transaction input message:

```
//SMTPSTEP EXEC PGM=IEBGENER
//SYSUT1   DD DISP=SHR,DSN=APPL.CNTLPDS(EMAILPRE)
//         DD DISP=OLD,DSN=&&TEMPDSN   <-- OUTPUT REPORT
//         DD DISP=SHR,DSN=APPL.CNTLPDS(EMAILSUF)
//SYSUT2   DD SYSOUT=(A,SMTP),
//         DCB=(LRECL=80,BLKSIZE=3120,RECFM=FB)
//SYSPRINT DD SYSOUT=*
//SYSIN    DD *
```

SYSUT1 is the DD statement used to append the components together. &&TEMPDSN is a temporary data set to which the generated batch job has written its output. SYSUT2 is the DD statement used to route the combined components to SMTP.

D. JCL Stream Submission

Referring again to FIG. 4, step 282 is the JCL stream submission, which is performed by the JCL stream submission component 235 in FIG. 3. At the logical conclusion of parsing the transaction input message and mapping the variables into the customized JCL skeletons, the JCL stream submission component 236 writes the JCL streams to the internal reader, as specified on a DD statement included in the message processing region JCL 240.

E. Customizable JCL Skeleton Data Set

The JCL skeleton component 238 shown in FIG. 3 is a partitioned data set (PDS) which contains JCL skeletons, which will be customized and appended to create JCL streams. The members which are selected are either explicitly specified in the transaction input message text, or are selected as needed in order to complete a JCL stream. This PDS is specified on a DD statement included in the Message Processing Region JCL 240. The following is an example of a customizable JCL skeleton. In this example, the following is a member REPORT in the PDS, as specified on one of the TASK=keywords on the example transaction input message:

```
//****************************************************
//*** STEP 1 *******************************************
//****************************************************
//PRECLEAN EXEC PGM=IEFBR14
//REPORT DD DISP=(MOD,DELETE),
//   DSN=#SENDER.REPORT.R.#DATE.#TIME,
//   UNIT=SYSDA,SPACE=(TRK,(1,1)),
//   DCB=(LRECL=133,BLKSIZE=6118,RECFM=FBA)
%DETAIL
//DETAIL DD DISP=(MOD,DELETE),
//   DSN=#SENDER.#DETAIL.R.#DATE.#TIME,
//   UNIT=SYSDA,SPACE=(TRK,(1,1)),
//   DCB=(LRECL=133,BLKSIZE=6118,RECFM=FBA)
%DETAIL
//****************************************************
//*** STEP 2 *******************************************
//****************************************************
//RUNRSR0 EXEC PGM=PGMRSR0
//   INCLUDE MEMBER=(PGMRCN0)
//SYSPRINT DD SYSOUT=*,DCB=(LRECL=133,RECFM=FBA)
//REPORT DD DISP=(NEW,CATLG,CATLG),
//   DSN=#SENDER.REPORT.R.#DATE.#TIME,
//   UNIT=SYSDA,SPACE=(TRK,(1,1)),
//   DCB=(LRECL=133,BLKSIZE=6118,RECFM=FBA)
%DETAIL
//REPORT DD DISP=(NEW,CATLG,CATLG),
//   DSN=#SENDER.#DETAIL.R.#DATE.#TIME,
//   UNIT=SYSDA,SPACE=(TRK,(1,1)),
//   DCB=(LRECL=133,BLKSIZE=6118,RECFM=FBA)
%DETAIL
//CNTLCRDS DD *
 SUBTYPE
%DETAIL
 DETAIL=#DETAIL
%DETAIL
//SYSUDUMP DD SYSOUT=*
//****************************************************
//*** STEP 3  ******************************************
//****************************************************
//PRTREPT EXEC PGM=IEBGENER
//SYSPRINT DD SYSOUT=*
//SYSUT1   DD DISP=SHR,
//         DSN=#SENDER.REPORT.R.#DATE.#TIME
%DETAIL
//         DD DISP=SHR,DSN=#SENDER.#DETAIL.R.#DATE.#TIME
%DETAIL
//SYSUT2   DD DISP=(NEW,PASS),
//   DSN=&&TEMPDSN,
//   UNIT=SYSDA,SPACE=(TRK,(1,1)),
//   DCB=(LRECL=133,BLKSIZE=6118,RECFM=FBA)
//SYSIN    DD *
```

It should be noted that &&TEMPDSN is a data set to which the generated batch job has written its output. Also, various substitution variables with a # symbol are found throughout the skeleton. % DETAIL is a line exclusion delimiter. The statements within each set of % DETAIL keywords are only included if a value for #DETAIL is included in the transaction input message. Note that the example input message does not contain the #DETAIL keyword. As a result, the generated JCL does not include those statements appearing within the sets of such line exclusion decimeters.

F. Message Processing Region JCL

The functioning of the message processing region JCL 240, shown in FIG. 3, will be further illustrated in the following example of a message processing region JCL 240 in accordance with one embodiment of the invention. The parameters specified on the PARM= and JOB statements have been abridged.

```
//MPRJOB JOB
//INIT EXEC PGM=DFSRRC00,REGION=0M,
//   PARM='MSG,001003004005,.....'
//STEPLIB  DD DISP=SHR,DSN=IMS.SDFSRESL
//         DD DISP=SHR,DSN=APPL.PGMLIB
//PROCLIB DD DISP=SHR,DSN=IMS.PROCLIB
//      UNIT=SYSDA,VOL=SER=IMSDCL
//SYSUT2   DD SYSOUT=(A,INTRDR),
//   DCB=(LRECL=80,BLKSIZE=3280,RECFM=FB)
//CNTLPDS DD DISP=SHR,DSN=APPL.CNTLPDS
```

In this example, the MPP programs used by the invention are in data set APPL.PGMLIB, which is concatenated in the STEPLIB DD statement. Also, the Customizable JCL skeleton data set is specified by the CNTLPDS DD statement. The internal reader is specified by the SYSUT2 DD statement. In this example, upon completion of the batch processing, the following e-mail would be sent to the web-based user:

```
HELO HOST
MAIL FROM:<userid@STLMVS1>
RCPT TO:<userid@US.IBM.COM>
NOOP
DATA
MIME-Version: 1.0
FROM:<userid@STLMVS1>
Subject: Batch Processing
Content-Transfer-Encoding: binary
Content-Type: multipart/alternative;
   boundary="--=_Boundary_017254381437.4529572916"
----=_Boundary_017254381437.4529572916
Content-Type: text/plain
-
1* ********************************************************
* IMS TOOL / DFSKSUM           DATE: 2006/223  TIME: 14:28  PAGE:
* ********************************************************
*
* CNTLCRDS: LOGOUT
* CNTLCRDS: SUMONLY
* CNTLCRDS: STARTSTCK=2006100181700
* CNTLCRDS: STOPSTCK=2006100181759
*
1* ********************************************************
* IMS TOOL / DFSKSUM           DATE: 2006/223  TIME: 14:28  PAGE: 1
* ********************************************************
*
```

```
* INPUT LOG DATA SET NAME(S)
* SAMPLE.LOG.DATASET
*
* ********************************************************************
* LOG INFORMATION SUMMARY FOR IMSID:
*
* FIRST LSN: 05444730      LAST LSN: 056D4546
* FIRST SELECTED LSN: 05344D1D
*
* FIRST LOG RECORD STCK   (UTC): 2006100 1749133
* LAST LOG RECORD STCK    (UTC): 2006100 1817599
* FIRST SELECTED LOG STCK (UTC): 2006100 1817000
* NO LOG RECORDS AVAILABLE TO DETERMINE OFFSET FROM UTC TO
LOCAL TIME
* ELAPSED TIME ON SELECTED LOG(S):                000 00:28
*
* START STCK SELECTED              : 2006100 1817000
* STOP STCK SELECTED               : 2006100 1817599
*
* TOTAL # OF LOG RECORDS READ AND PROCESSED   :  10110
* TOTAL # OF LOG RECORDS SKIPPED              :  41304
* ********************************************************************
*       END OF IMS LOG SHORT SUMMARY REPORT
* ********************************************************************
----=_Boundary_017254381437.4529572916--
----=_Boundary_017254381437.4529572916--
.
QUIT
```

Although the embodiments disclosed herein using the z/OS operating system and the IMS transaction and database management system as an exemplary platform, those of ordinary skill in the art will appreciate that the teachings contained herein can be apply to other operating systems and database management systems. For example, other transaction management systems such as CICS could also be used with the present invention. References in the claims to an element in the singular is not intended to mean "one and only" unless explicitly so stated, but rather "one or more." All structural and functional equivalents to the element s of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiment of the present invention has been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method for initiating batch processing on a server from a client computer comprising:
   generating a message from the client computer identifying a transaction to be initiated on the server;
   transmitting the message to the server;
   in response to processing the message at the server, extracting data from the message to use to generate a batch job control language (JCL);
   running the batch JCL at the server to generate an output; and
   routing the output of the batch JCL to the client computer.

2. The method of claim 1, wherein using the extracted data from the message to generate the batch JCL further comprises:
   using character strings from the message to identify parameters to map in to the batch JCL.

3. The method of claim 2, wherein using the character strings further comprises:
   mapping the parameters into JCL skeletons;
   determining which parts of the skeletons are to be retained and removed based on character string indicators to customize the JCL skeletons; and
   generating batch JCL streams from the customized JCL skeletons.

4. The method of claim 2, wherein using the extracted data from the message to generate the batch JCL further comprises:
   using the character strings of the message to identify components to map into the batch JCL.

5. The method of claim 2, further comprising:
   maintaining, by the server, predefined reserved keywords representing character strings in the message which indicate an action to be taken or are associated with values supplied by the user.

6. The method of claim 5, wherein the reserved keywords include keywords used to specify a JCL skeleton number to use to generate the batch JCL.

7. The method of claim 5, wherein the reserved keywords include substitution variables that users can dynamically define in the message that are mapped into the JCL skeletons and substitution variable labels that identify labels at which substitution variables will be mapped into the JCL skeleton.

8. A system in communication with a client computer, comprising:
   a processor; and
   a computer readable storage device including programs executed by the processor to perform operations, the operations comprising:
   receiving a message from the client computer identifying a transaction to be initiated on the server;
   in response to processing the message, extracting data from the message to use to generate a batch job control language (JCL);

running the batch JCL at the server to generate an output; and routing the output of the batch JCL to the client computer.

9. The system of claim 8, wherein using the extracted data from the message to generate the batch JCL further comprises:

using character strings from the message to identify parameters to map in to the batch JCL.

10. The system of claim 9, wherein using the character strings further comprises:

mapping the parameters into JCL skeletons;

determining which parts of the skeletons are to be retained and removed based on character string indicators to customize the JCL skeletons; and generating batch JCL streams from the customized JCL skeletons.

11. The system of claim 9, wherein using the extracted data from the message to generate the batch JCL further comprises:

using the character strings of the message to identify components to mapping into the batch JCL.

12. The system of claim 9, wherein the operations further comprise:

maintaining, by the server, predefined reserved keywords representing character strings in the message which indicate an action to be taken or are associated with values supplied by the user.

13. The system of claim 12, wherein the reserved keywords include keywords used to specify a JCL skeleton number to use to generate the batch JCL.

14. The system of claim 12, wherein the reserved keywords include substitution variables that users can dynamically define in the message that are mapped into the JCL skeletons and substitution variable labels that identify labels at which substitution variables will be mapped into the JCL skeleton.

15. A computer program product comprising a computer readable medium device having computer readable program code embodied therein that is executed by a processor to communicate with a client computer and to perform operations, the operations comprising:

receiving a message from the client computer identifying a transaction to be initiated on the server;

in response to processing the message at the server, extracting data from the message to use to generate a batch job control language (JCL);

running the batch JCL at the server to generate an output; and routing the output of the batch JCL to the client computer.

16. The computer program product of claim 15, wherein using the extracted data from the message to generate the batch JCL further comprises:

using character strings from the message to identify parameters to map in to the batch JCL.

17. The computer program product of claim 16, wherein using the character strings further comprises:

mapping the parameters into JCL skeletons;

determining which parts of the skeletons are to be retained and removed based on character string indicators to customize the JCL skeletons; and generating batch JCL streams from the customized JCL skeletons.

18. The computer program product of claim 16, wherein using the extracted data from the message to generate the batch JCL further comprises:

using the character strings of the message to identify components to mapping into the batch JCL.

19. The computer program product of claim 16, further comprising:

maintaining, by the server, predefined reserved keywords representing character strings in the message which indicate an action to be taken or are associated with values supplied by the user.

20. The computer program product of claim 19, wherein the reserved keywords include keywords used to specify a JCL skeleton number to use to generate the batch JCL.

21. The computer program product of claim 19, wherein the reserved keywords include substitution variables that users can dynamically define in the message that are mapped into the JCL skeletons and substitution variable labels that identify labels at which substitution variables will be mapped into the JCL skeleton.

* * * * *